(12) United States Patent
Prust et al.

(10) Patent No.: US 6,874,213 B2
(45) Date of Patent: Apr. 5, 2005

(54) MACHINE TOOL AND METHOD FOR MACHINING A ROD-SHAPED WORKPIECE

(75) Inventors: Dirk Prust, Tuttlingen (DE); Rudolf Haninger, Seitingen-Oberflacht (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 10/147,117

(22) Filed: May 16, 2002

(65) Prior Publication Data

US 2002/0194967 A1 Dec. 26, 2002

(30) Foreign Application Priority Data

May 17, 2001 (DE) .......................................... 101 25 729
Sep. 10, 2001 (DE) .......................................... 101 45 674

(51) Int. Cl.⁷ .............................. B23P 23/02; B23C 3/02
(52) U.S. Cl. ........................ 29/27 C; 409/165; 409/201; 409/211
(58) Field of Search .............................. 29/27 C, 27 R; 409/201, 204, 211, 216, 242, 165, 166, 167, 225, 221, 219; 408/236

(56) References Cited

U.S. PATENT DOCUMENTS

| | | | |
|---|---|---|---|
| 3,359,861 A | * 12/1967 | Johnson et al. | 409/211 |
| 3,371,580 A | 3/1968 | Barnes et al. | 90/11 |
| 4,187,601 A | * 2/1980 | Aldrin | 29/560 |
| 5,222,283 A | * 6/1993 | Laschet | 29/27 C |
| 5,346,343 A | * 9/1994 | Babel | 409/201 |
| 5,584,621 A | * 12/1996 | Bertsche et al. | 409/201 |
| 5,664,308 A | * 9/1997 | Deitert | 29/40 |
| 5,964,016 A | * 10/1999 | Ito et al. | 29/27 C |
| 6,185,818 B1 | * 2/2001 | Ito et al. | 29/889.7 |
| 6,357,094 B1 | * 3/2002 | Sugimoto | 29/27 C |
| 6,447,224 B2 | * 9/2002 | Mitsuzono et al. | 409/201 |

FOREIGN PATENT DOCUMENTS

| | | |
|---|---|---|
| DE | 38 24 602 A1 | 1/1990 |
| DE | 199 19 647 A1 | 11/2000 |
| DE | 199 48 335 C1 | 7/2001 |
| EP | 0 666 132 A1 | 8/1995 |

* cited by examiner

Primary Examiner—A. L. Wellington
Assistant Examiner—Dana Ross
(74) Attorney, Agent, or Firm—Weingarten, Schurgin, Gagnebin & Lebovici LLP (57) ABSTRACT

The invention relates to a machine tool for machining a rod-shaped workpiece. The machine tool comprises a tool spindle, and also a first holder and a second holder for accommodating the workpiece. In a machining position, the second holder is oriented coaxially to the first holder, and it is arranged so as to be capable of rotating or swiveling about an axis perpendicular to a longitudinal axis of the workpiece.

14 Claims, 8 Drawing Sheets

MACHINE TOOL AND METHOD FOR MACHINING A ROD-SHAPED WORKPIECE

BACKGROUND OF THE INVENTION

The invention relates to a machine tool for machining a rod-shaped workpiece, and, in particular, to a machine tool having a tool spindle and also a first holder and a second holder for accommodating the workpiece.

The invention further relates to a method of machining a rod-shaped workpiece using such a machine tool which has a tool spindle and also a first holder and a second holder for accommodating the workpiece.

A machine tool is known from DE 199 19 647 A1. The known machine tool is a traveling-column machine, on the machine bed of which a workholding fixture for a workpiece is arranged. The workholding fixture is swivelable about a horizontal axis, so that both a longitudinal side and an end face opposite the clamping point of a workpiece clamped therein can be machined by a tool which is accommodated in a tool spindle fastened to the traveling column. In order to also be able to machine the sixth workpiece side, a type of robot arm (manipulator) is provided, this robot arm being swivelable about a vertical axis and having a gripper. After the completion of the machining of the five sides of the workpiece which are accessible first of all, the gripper takes the workpiece out of the workholding fixture. The robot arm is then swiveled by 90° in the horizontal and by 180° about its longitudinal axis and the gripper is put into a clamping station. The clamping station holds and fixes the gripper and thus the workpiece still accommodated therein in a precise position, so that the workpiece can now also be machined on its sixth side by the tool.

In general, conventional lathes also have a workholding fixture with a self-centering chuck, in which the workpiece to be machined is clamped in a rotationally fixed manner. A tailstock, which can be displaced and clamped in place on a machine bed, often serves as the counterpart. In this case, the workpiece is often centered by means of a mandrel which is accommodated in a chuck of the tailstock, this chuck being designed specifically for this purpose and being designated as tailstock quill. Alternatively, or in addition, a steadyrest, for this purpose, is often fastened to the machine bed in a longitudinally displaceable manner in such lathes, this steadyrest supporting the workpiece like an intermediate bearing in order to prevent in this way a deflection of the workpiece under the effect of the cutting pressure.

In order to also be able to machine the workpiece in such lathes at the clamping point at which it is accommodated in the chuck of the workholding fixture, the workpiece is removed from the workholding fixture and clamped again in the latter in a position turned round by 180°. This operation is relatively time-consuming and could hitherto only be automated with difficulty and with considerable design outlay.

SUMMARY OF THE INVENTION

It is an object of the present invention to simplify the overall design of the machine tool mentioned at the beginning. It is another object to provide a machine tool that easily allows to machine the clamping point at which the workpiece is accommodated in the first holder by means of a tool accommodated in the tool spindle. A further object of the invention is to provide a machine tool that allows a precise machining of a workpiece at its clamping point at which the workpiece is accommodated in the first holder. Another object is to provide a method for easy and precise machining of rod-shaped workpieces at several surfaces.

With a machine tool of the kind mentioned at the beginning, these and other objects are achieved according to one aspect of the invention by the second holder, in a machining position, being oriented coaxially to the first holder and being arranged so as to be rotatable or swivelable about an axis perpendicular to a longitudinal axis of the workpiece.

According to another aspect of the invention, the object is achieved by a method comprising the following steps:
a) orienting the first and second holder coaxially with respect to one another,
b) inserting the workpiece into the first and second holder,
c) machining the first surface of the workpiece with a tool accommodated in the tool spindle,
d) releasing the workpiece from the first holder,
e) rotating or swiveling the second holder about a first swivel axis which is perpendicular to the longitudinal axis of the workpiece, and
f) machining the second surface of the workpiece while holding the workpiece in the second holder.

Due to the rotating and swiveling capability of the second holder, the workpiece accommodated therein can be moved away from the first holder to such an extent that the clamping point is readily accessible for machining by a tool inserted into the tool spindle. In order to be able to rotate or swivel the workpiece, it may have been be severed, for example, beforehand at a point between the first holder and the second holder, e.g. by milling or sawing. However, the workpiece may also be rotated or swiveled in one piece, i.e. as an entity, with the second holder if it is completely pushed out of the first holder beforehand. This may be effected, for example, by a feed device known per se or also by means of a second workpiece which is inserted into the first holder and pushes the first workpiece out of the latter in the process.

In a traveling-column machine, that clamping point of the workpiece which has been freed by the rotation or swiveling is preferably approached by the tool spindle and machined with the tool accommodated therein. In principle, however, it is likewise possible to traverse the second holder in such a way that the clamping point of the workpiece is fed into the rotating tool spindle, which is otherwise spatially fixed.

The second holder is preferably rotatable or swivelable by at least 180°.

In this way, the workpiece held by the second holder can be completely turned round, as a result of which the point at which it was held beforehand in the first holder becomes readily accessible. If this should be necessary, the workpiece can also be turned round repeatedly, so that the axial ends of the workpiece can be machined alternately.

If the second holder is arranged to be rotatable, the coaxial orientation relative to the first holder is retained after the rotation. On the other hand, during a swiveling movement of the second holder by 180°, only a parallel, but not coaxial, orientation relative to the first holder is achieved. A swiveling movement is in many cases to be preferred compared with a rotary movement, since, in this way, a workpiece held by the second holder, after the swiveling, cannot collide with a workpiece still located in the first holder, e.g. a part cut off previously.

It is therefore especially preferred if the second holder, for achieving a swiveling movement, is arranged eccentrically to the perpendicular axis. The perpendicular axis therefore does not intersect the longitudinal axis of the workpiece.

In a preferred development of this configuration, the second holder is arranged on a support rotatable about the perpendicular axis. In addition, at least one further holder is arranged on the support eccentrically to the perpendicular axis, so that the further holder, by rotation of the support about the perpendicular axis, can be shifted into a position coaxial to the first holder.

In this way, a plurality of holders, preferably different holders, can be made available for accommodating workpieces by a simple rotary movement of the support. The holder selected is oriented coaxially in alignment with the first holder by rotating the support about the perpendicular axis. The workpiece can be inserted into this selected holder, for example by feeding it in its longitudinal direction, and it can then be further machined. Holders of the same type may also be arranged on the support. This is expedient, for example, when, during the machining of a turned-round workpiece, another workpiece is already to be inserted again into a further holder.

However, it is especially preferred if the further holders are designed differently, in particular as a steadyrest, as a tailstock quill or as a power-operated clamping block.

In this way, a type of multifunction platform is provided, a change of function being effected by simple rotation of the support. One holder may be designed, for example, as a tailstock quill with a mandrel accommodated therein, whereby a centering with sufficient support of the workpiece is made possible, in particular in the case of relatively small cutting forces or in the case of short workpieces. Another holder may be designed as a steadyrest, with which relatively large cutting forces can be absorbed even during longitudinal lathe working. In this case, the steadyrest can support the workpiece, for example, at three circumferential points with fixed jaws or with rollers. With a holder which is designed as a power-operated clamping block and in which the workpiece is firmly fixed, the workpiece can be seized and turned round by rotating the support. Especially during milling or drilling operations, which require the workpiece to be rigidly fixed, the use of a power-operated clamping block as holder is expedient. The holders are preferably releasably fastened to the support, so that they can be exchanged for holders having other functions. On account of this modular construction, the multifunction platform can be adapted to widely differing requirements.

In addition, it is especially preferred if the first holder is arranged so as to be spatially fixed relative to the machine tool, and the second holder is arranged so as to be traversable parallel to the longitudinal axis of the workpiece.

This has the advantage that the second holder, which for this purpose is preferably designed as a steadyrest, can always be traversed into the immediate vicinity of the instantaneous machining point. In this way, the workpiece can always be optimally supported in short sections, so that bending moments which occur do not lead to deformation of the workpiece. Furthermore, the traversing capability enables the second holder, if need be together with a support to which it is fastened with further holders, to be moved out of the possible machining region to such an extent that it does not impair the machining of a workpiece accommodated in the first holder.

If the second holder enables the workpiece to be firmly fixed in the longitudinal direction, as is the case, for example, with a power-operated clamping block, the latter may also be used as a feed unit for the workpiece. Thus, for example, sections of the workpiece can be successively machined by advancing the workpiece by a corresponding section length, after the machining of a section, and by the machining being continued at the next section, while the workpiece is always being held by the first holder. In this way, such workpieces which are longer than the machining region which can be reached by the traveling column can also be machined. The length of the workpiece can even be greater than the width of the machine tool, provided a machine housing possibly present has suitable openings for the workpieces to pass through.

The first holder can likewise be designed as a power-operated clamping block. This is preferred, for instance, when it is only intended to machine the workpiece on its longitudinal side pointing towards the tool spindle, so that no rotation of the workpiece about its longitudinal axis is required.

Alternatively, the first holder is preferably designed as a lathe spindle.

In this way, a lathe working operation on the workpiece is possible. Instead of the lathe spindle, a rotary table may also be used as the first holder, this rotary table permitting an infeed at a precise angle and thus four-sided machining of the workpiece held therein. A suitable first holder is also an NC lathe spindle, which combines the properties of a lathe spindle with those of a rotary table, i.e. high number of revolutions and positioning at a precise angle.

In a preferred configuration, the machine tool has a traveling column, to which the tool spindle rotatable about a spindle axis is fastened in such a way as to be swivelable about a swivel axis, the swivel axis being arranged perpendicularly to one or both the spindle axis and a longitudinal axis of the workpiece.

Owing to this swivelable arrangement of the tool spindle, the workpiece can be machined not only perpendicularly to its circumferential surface but also at an angle thereto. The end faces of the workpiece can also be reached in this way without the workpiece having to be swiveled. This is especially advantageous in the case of long workpieces, since swiveling space of complicated design otherwise has to be provided for this purpose.

In an advantageous development of this configuration, the swivel axis is arranged so as not to intersect the spindle axis.

This enables the spindle to be fastened to the traveling column in a more simple manner in terms of design and in a more robust manner, since a swiveling device provided for swiveling the tool spindle is not interrupted by the work spindle. Apart from that, this measure is also advantageous in such machine tools in which the swivel axis is not oriented perpendicularly to the longitudinal axis of the workpiece but is oriented in another way, in particular parallel thereto.

In a further preferred configuration, the tool spindle is swivelable by a swivel angle of at least 90°.

This has the advantage that machining may also be effected perpendicularly to the end face of the workpiece. If the first holder is designed as a rotary table or NC lathe spindle, six-sided machining of the workpiece is thus possible, since the clamping point of the workpiece also becomes accessible for machining by rotating or swiveling the second holder. This aspect is especially important, for example, when machining aluminum profiles, since these are often to be machined mainly at the end face at both ends.

In addition, since the perpendicular axis about which the second holder is rotatable or swivelable is arranged perpendicularly to the swivel axis of the tool spindle, machining of the workpiece is possible in any spatial angular position between tool and workpiece. This also applies to the sixth side (clamping point) of the workpiece. This special property is achieved without redundancy, i.e. with minimum design input.

At swivel angles of more than 90°, even the underside of the workpiece can be reached by the tool, a factor which is especially important if the workpiece cannot be rotated about its longitudinal axis. On the whole, very complex machining operations with widely differing requirements can be carried out in this way in an automated manner.

In another preferred configuration of this development, the tool spindle, preferably together with a drive for it, is accommodated in a spindle housing, and the swivel axis runs at the level of the front half of the spindle housing, said front half having a tool carrier, preferably at the level of the front quarter of the spindle housing.

Owing to a small distance between tool carrier and swivel axis, the tool moves on a circular path of small radius during the swiveling of the tool spindle, a factor which leads to short compensating movements of the traveling column if only the angular position of the tool, but not its spatial position as such, is to be varied. Together with the arrangement of swivel axis and spindle axis in such a way that they do not intersect, short traverse paths of the traveling column in the direction perpendicularly to the longitudinal axis of the workpiece and to the swivel axis can also be realized. In traveling-column machines in the conventional style, in which both the workpieces and the swivel axis are arranged horizontally, the traverse paths in the vertical are shortened by this measure. Consequently, such a machine tool requires a small amount of space in the vertical; the "Z-axis" can therefore be designed with a short stroke.

In this case, the smaller the distance between the swivel axis and the tool, the smaller the radius of movement of the tool during the swiveling movement. However, the swivel axis cannot also be arranged as close to the tool as desired, since the space around the tool should remain as free as possible. Only then is it ensured that the tool can reach and machine the workpiece in all positions without impairment by a swiveling device required for the swiveling capability. Such a swiveling device is therefore preferably located in the immediate vicinity of an end face of the spindle housing or even terminates flush with this end face.

It goes without saying that the above-mentioned features and the features still to be explained below can be used not only in the respectively specified combination but also in other combinations or on their own without departing from the scope of the present invention.

BRIEF DESCRIPTION OF THE DRAWINGS

Further features and advantages of the invention follow from the description below of an exemplary embodiment of the invention with reference to the drawing, in which.

DETAILED DESCRIPTION OF PREFERRED EMBODIMENTS

Figure 1:
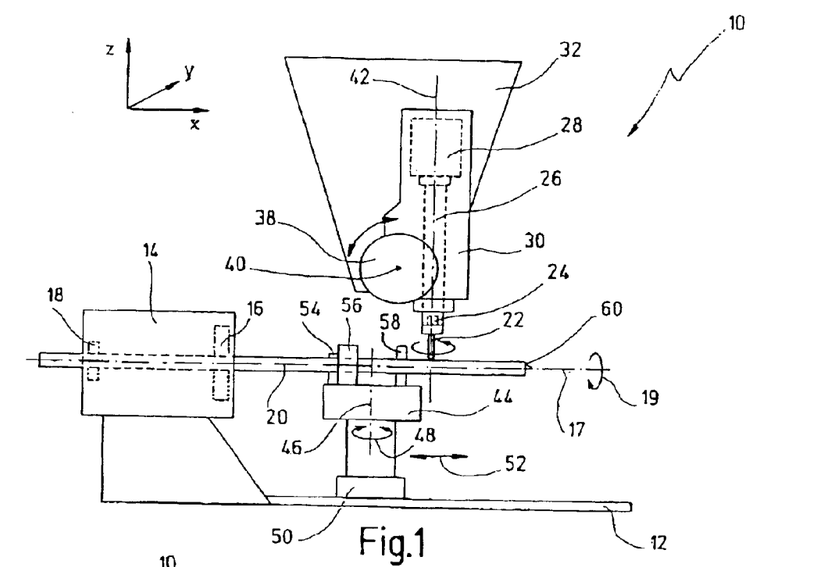
FIG. 1 shows a side view of some subassemblies of a new machine tool in a simplified schematic representation.

In a schematic simplified representation, FIG. 1 shows some subassemblies of a new machine tool, this machine tool being designated overall by 10 and being designed as a traveling-column machine. Fastened to a machine bed 12 is an NC lathe spindle 14, in which chuck jaws 16 and a shaft encoder 18 connected to a control (not shown) of the machine tool are only indicated schematically. By means of the NC lathe spindle 14, a rod-shaped workpiece 20 clamped in the chuck jaws 16 can be set in rotation about a longitudinal axis (indicated by 17), as indicated in FIG. 1 by an arrow 19. In this case, the rotary frequency is so high—preferably several thousand revolutions per minute—that the workpiece 20 can be subjected not only to a milling and drilling operation on the traveling-column machine, but also to a lathe working operation. The shaft encoder 18 detects the angular position of the workpiece 20, as a result of which a precise angular orientation of the workpiece 20, as is known, for instance, from conventional NC rotary tables, is made possible. In this way, the workpiece 20 can be fed in at a precise angle in order to be able to carry out the milling work and the like, which is conventional for a traveling-column machine, at the circumferential surface of said workpiece 20.

The workpiece 20 is machined with a tool 22 which is accommodated in a tool carrier 24 of a tool spindle 26. The tool spindle 26 is accommodated in a spindle housing 30 together with a drive 28 (only schematically indicated in FIG. 1).

With the spindle housing 30, the tool spindle 26 is fastened to a traveling column 32 in such a way as to be swivelable, the traveling column 32 being traversable in all three spatial directions, i.e. in the vertical Z and in both horizontal spatial directions X and Y. The swiveling capability of the spindle housing 30 relative to the traveling column 32 is made possible by a swiveling device 38, which may have, for example, a swivel shaft reaching over the entire extent of the spindle housing 30 in the Y-direction. The swiveling device 38 establishes a swivel axis 40 which runs in the Y-direction, i.e. perpendicularly to both the longitudinal axis 17 of the workpiece 20 and the spindle axis 42, about which the tool spindle 26 is set in rotation by the drive 28.

Furthermore, the machine tool 10 has a support 44 which can be rotated in a motor-operated manner about an axis 46 perpendicular to the horizontal longitudinal axis 17 of the workpiece 20, as indicated in FIG. 1 by an arrow 48. To this end, the support 44 is connected via a joint to a rider 50, which is guided on rails (which cannot be seen in FIG. 1), so that it can be traversed in a motor-operated manner in the X-direction, as indicated by an arrow 52.

Arranged on the support 44 are three holders 54, 56 and 58, which hold or support the workpiece 20 like an abutment. Further details concerning the holders 54, 56 and 58 are explained further below with reference to FIGS. 5a to 5d.

During a lathe working operation on the workpiece 20, which is likewise possible on the traveling-column machine 10, the workpiece 20 is set in rotation by the NC work spindle 14, while a suitable tool 22, e.g. a lathe tool, profiles the workpiece 20. The tool spindle 26, in which this tool is clamped, is locked for this purpose, so that it cannot rotate. In this case, the traveling column 32 with the tool spindle 26 fastened thereto moves in both the Z-direction and the X-direction. During other machining operations, e.g. drilling or milling on the circumferential surface of the workpiece 20, the latter is first of all shifted into the desired angular position by means of the NC work spindle 14 and is then machined with a suitable tool 22, which is set in rotation by the tool spindle 26.

If the workpiece 20 is to be machined at its end face 60, the spindle housing 30 is swiveled about the swivel axis 40 until the tool spindle 26 has assumed the desired angular position relative to the longitudinal axis 17 of the workpiece 20.

Figure 2:
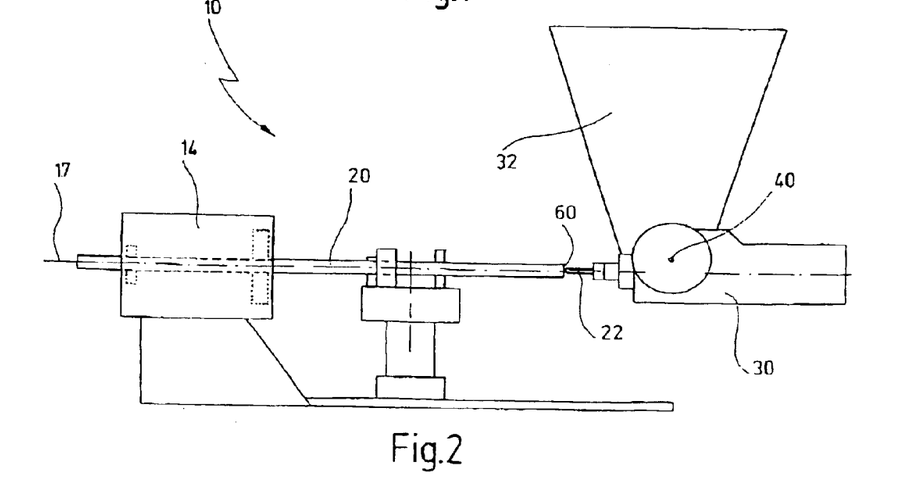
FIG. 2 shows the machine tool from FIG. 1 with swiveled tool spindle.

FIG. 2 shows the machine tool 10 with a spindle housing 30 swiveled in such a way. In addition, in order to be able to reach the end face 60 of the workpiece 20 from the position shown in FIG. 1, the traveling column 32 has been traversed in the X-direction and also in the Z-direction. In the machining position shown in FIG. 2, the spindle housing 30 has been swiveled by 90° relative to its vertical position shown in FIG. 1, so that the tool 20 can act perpendicularly on the end face 60 of the workpiece 20. At swivel angles greater than 90°, the tool 22 can also reach under the workpiece 20, a factor which is expedient, for instance, when the workpiece 20 cannot be rotated about its longitudinal axis 17 or when a simple clamping block is used as holder instead of an NC work spindle 14.

Figure 3:
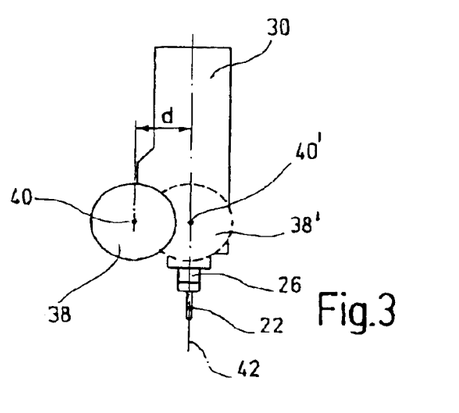
FIG. 3 shows a side view of a spindle housing of the machine tool shown in FIG. 1, in which different arrangements of a swivel axis are indicated.

In the machine tool 10 shown in FIG. 1, the swivel axis 40 is arranged so as to be offset from the spindle axis 42 and therefore does not intersect the latter. In FIG. 3, which shows the spindle housing 30 with the swiveling device 38, this offset is designated by d; furthermore, an alternative arrangement of a swiveling device 38' in which the swivel axis 40' intersects the spindle axis 42 is indicated by a broken line. Depending on whether or not the swivel axis 40 intersects the spindle axis 42, different paths of movement are obtained for the spindle housing 30 and in particular for the tool 22 accommodated in the tool spindle 26.

Figure 4A:
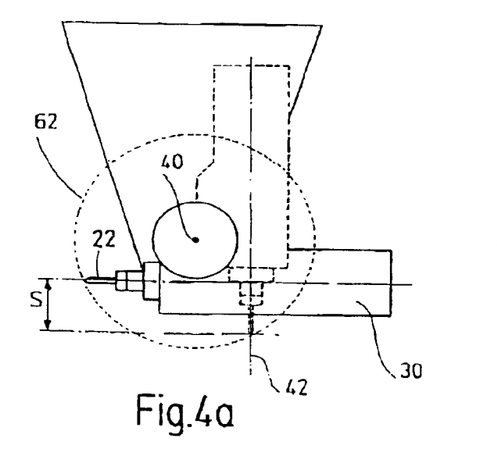
FIGS. 4a and 4b show paths of movement of tools during the swiveling for the two arrangements of the swivel axis which are shown in FIG. 3.
Figure 4B:
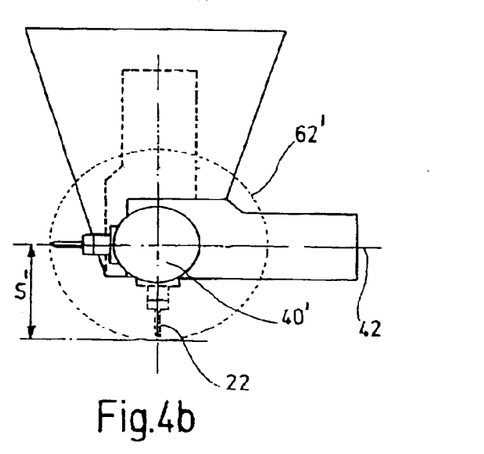

These paths of movement are shown in FIGS. 4a and 4b. In the machine tool shown in FIG. 4a, the swivel axis 40 is offset from the spindle axis 42 by the distance d, as is also the case in FIG. 1. During the transition between a vertical and a horizontal position (cf. FIGS. 1 and 2), the tip of the tool 22 describes a section of a circular path 62. During this swiveling movement, the tip of the tool 22 covers a total distance s in the vertical Z.

FIG. 4b shows a machine tool in which the swivel axis 40' intersects the spindle axis 42. In this case, the tip of the tool 22 likewise describes a section of a circular path 62', the radius of which, however, is smaller than that of the circular path 62. From a comparison between FIGS. 4a and 4b, it can be seen that the distance s' which the tip of the tool 22 covers in the vertical Z in this case is greater than the distance s which can be covered in the Z-direction when swivel axis 40 and spindle axis 42 are arranged so as not to intersect. If the workpiece 20 is therefore to be machined in one spatial direction and then perpendicularly thereto by the tool 22, the machine tool shown in FIG. 4a requires a smaller traverse path of the traveling column 32 in the vertical (Z-direction) than is the case in the machine tool according to FIG. 4b. On account of this smaller traverse path, the overall height of the machine tool can be reduced.

In addition, it can be seen from FIG. 3 that the swivel axis 40 is located in the front quarter of the spindle housing 30, i.e. as close to the tool 22 as possible. This measure helps to keep the radius of the circular path 62 small and thus the requisite traverse paths for the traveling column 32 small. As can be seen in FIG. 3, however, the swivel axis 40 should also not be arranged too close to the tool 22, since the swiveling device 38 may otherwise be in the way during the machining of the workpiece 20.

FIGS. 5a to 5d show the machine tool 10 in plan view, the traveling column 32 with the spindle housing 30 fastened thereto not being shown. In particular, the NC work spindle 14 with the workpiece 20 held therein and also the support 44, which is traversable on rails 64 and 66 in the X-direction indicated by 52, can be seen in the plan view.

The three holders 54, 56 and 58 are arranged on the support 44 eccentrically to the perpendicular axis 46. In this case, the arrangement is made in such a way that, when the support 44 is rotated about the perpendicular axis 46, the holders 54, 56 and 58 are oriented in their respective machining position coaxially to the NC work spindle 14 or to the workpiece 20 held therein.

Figure 5A:
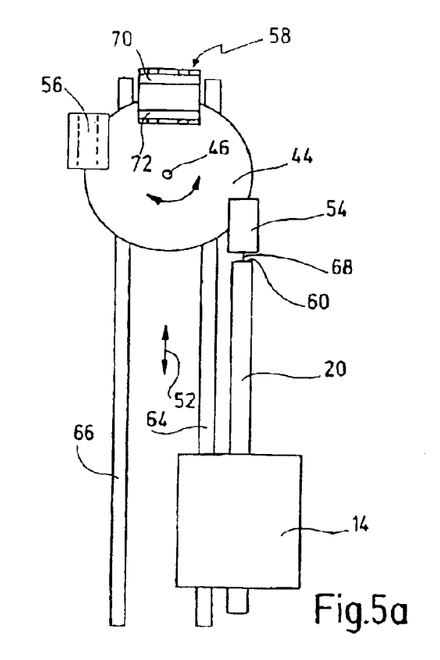
FIGS. 5a to 5d show a plan view of the machine tool of FIG. 1, in a simplified schematic representation, in which a multifunction platform with a plurality of holders in different rotary positions can be seen.

The holder 54, which in FIG. 5a is in the functional position, is designed as a tailstock quill having a mandrel 68 which holds the workpiece 20 at its end face 60, as is expedient, for example, for centering during a lathe working operation.

Figure 5B:
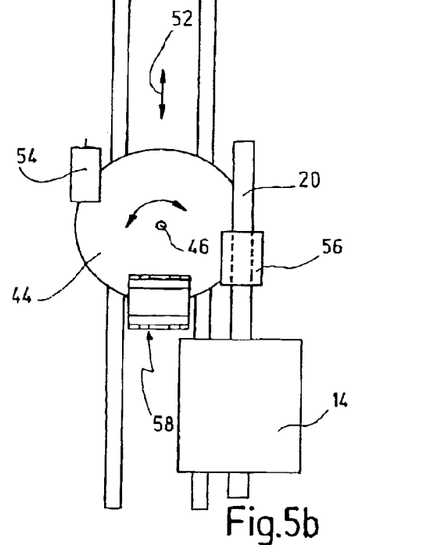

The holder 56, which in FIG. 5b is in the functional position, is designed as a steadyrest, through which the workpiece 20 can be passed. In the process, the steadyrest 56 supports the workpiece 20 in such a way that, even with relatively large cutting forces, machining in the vicinity of the steadyrest 56 is possible without bending forces which occur leading to deformation of the workpiece 20. By the support 44 being traversed in the direction of arrow 52, the workpiece 20 can be supported where machining is to be carried out. In this way, the workpiece 20 can always be supported in short sections.

Figure 5C:
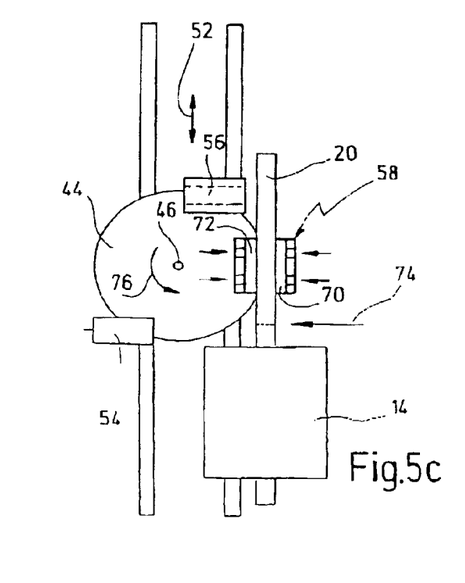
Figure 5D:
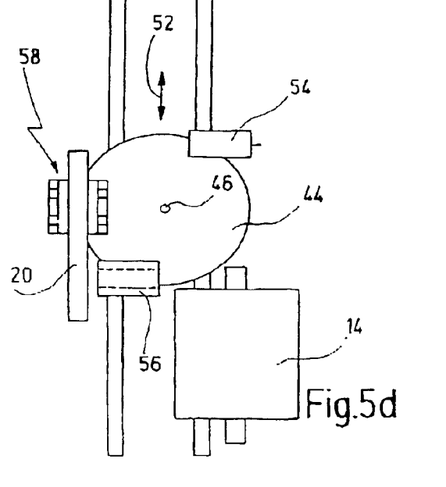

The holder 58, which is oriented coaxially to the NC work spindle 14 in FIG. 5c and parallel thereto in FIG. 5d, is designed as a power-operated clamping block which has hydraulically operable clamping jaws 70 and 72. A workpiece 20 can be firmly fixed by means of the power-operated clamping block 58, as is generally required during drilling and milling work. In addition, the power-operated clamping block 58 can be used to effect a feeding of the workpiece 20 in the X-direction. In this way, longer workpieces can also be machined successively.

To turn round the workpiece 20, it is first of all severed by sawing or milling at the point identified by an arrow 74 in FIG. 5c. The support 44 with the holders fastened thereto is then rotated by 180° in the direction of an arrow 76, as a result of which the workpiece part 20' still fixed in the power-operated clamping block 58 is swiveled. In this case, the workpiece part 20' shifts into the position shown in FIG. 5d. In this turned-round position, the workpiece part 20' can also be machined on its side previously pointing towards the NC work spindle 14. The power-operated clamping block 58 therefore has two machining positions, namely one machining position coaxial to the first holder and a second parallel thereto.

A workpiece 20 may of course also be turned round without being cut off beforehand. In this case, by the support 44 being traversed in the X-direction 52, the workpiece 20 merely has to be pulled out of the NC work spindle 14 until it is no longer held by the latter. The workpiece 20 can then be turned round, as just described, by rotating the support 44 about the perpendicular axis 46. Depending on the type of machining, it may possibly also be sufficient to rotate the support 44 by less than 180°, e.g. by 90°. Even then, however, the clamping point or cutting-off point is at least partly accessible for machining.

The support 44 therefore constitutes a multifunction platform on which holders having different functions can be shifted into a working position by simple rotation about the perpendicular axis 46. Together with the traversing capability of the support 44 in the X-direction 52, a wide variety of machining possibilities are obtained for the workpiece 20. The holders 54, 56 and 58 are preferably releasably fastened to the support 44, so that they can be exchanged for holders having other functions.

Figure 6:
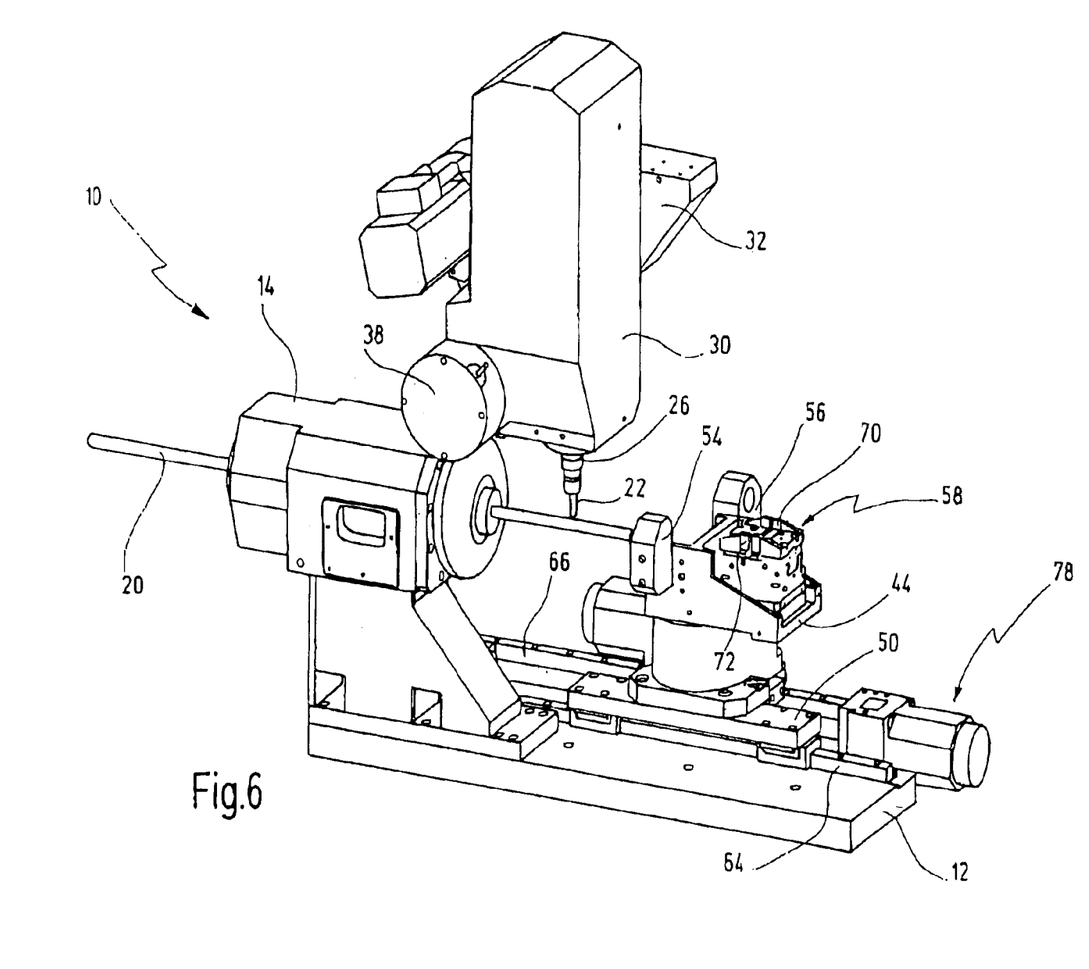
FIG. 6 shows the machine tool of FIG. 1 in a perspective representation, in which, in accordance with FIG. 5a, a rod-shaped workpiece is held between an NC work spindle and a tailstock quill.
Figure 7:
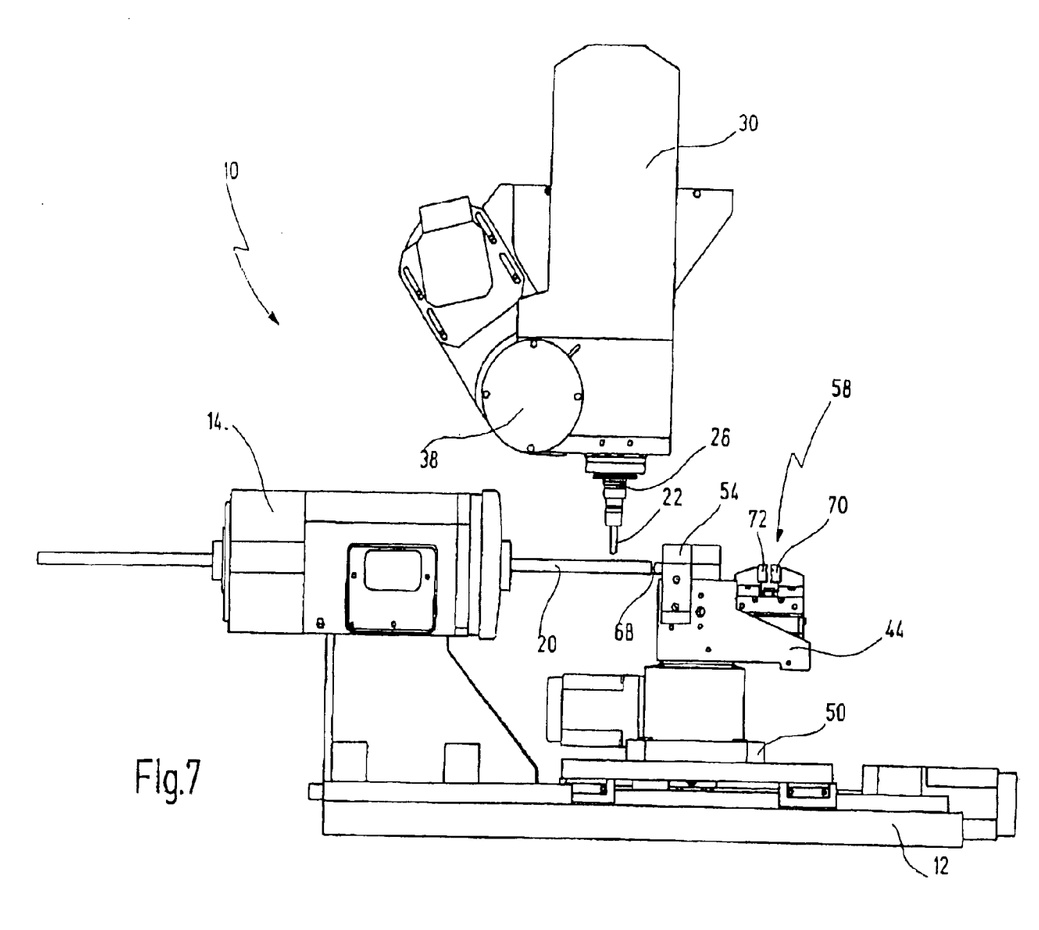
FIG. 7 shows the machine tool of FIG. 6 in a front view.

FIGS. 6 and 7, in a perspective representation and in a front view, respectively, show the machine tool 10 in the machining position shown in FIG. 5a. Numerous additional design details of the inventive machine tool 10 can be seen in this representation, e.g. an automatic feed device 78 for traversing the support 44. FIGS. 6 and 7 show the machine tool 10 during the machining of a cylindrical workpiece 20 which is clamped in the NC work spindle 14 and is centered at its free end by means of the mandrel 68 of the tailstock quill 54. The tool 22 in this case is a lathe working tool.

Figure 8:
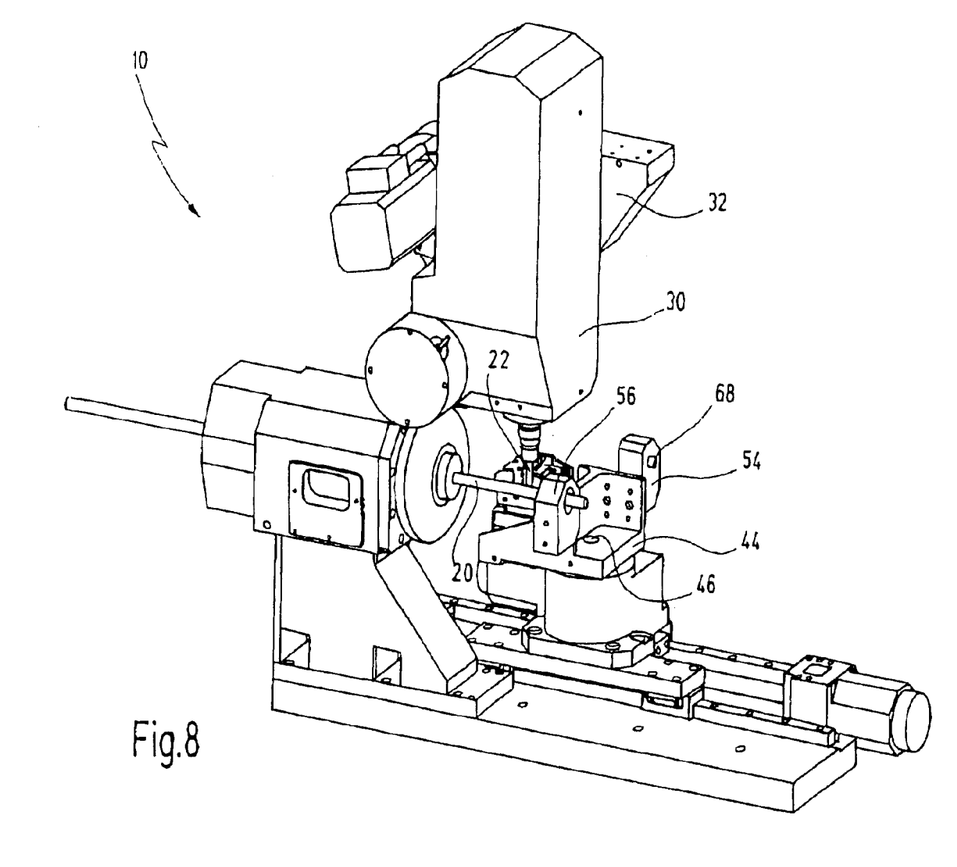
FIG. 8 shows the machine tool of FIG. 1 in a perspective representation, in which, in accordance with FIG. 5b, a rod-shaped workpiece is held by an NC work spindle and a steadyrest.
Figure 9:
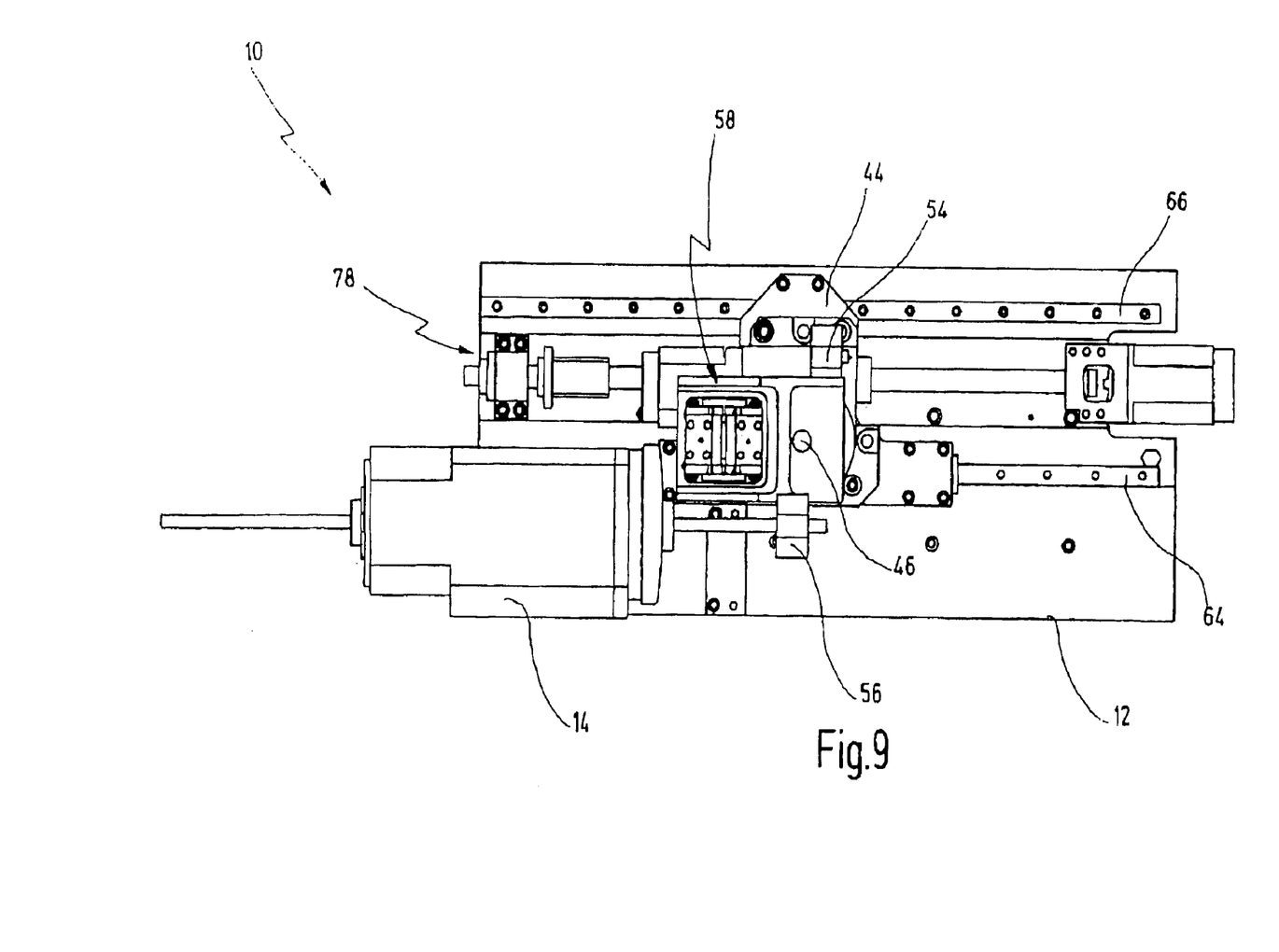
FIG. 9 shows the machine tool of FIG. 8 in plan view.

FIGS. 8 and 9, in a perspective representation and in plan view, respectively, show the machine tool 10 in the machining position shown in FIG. 5b. Here, the cylindrical workpiece 20 is held by the NC work spindle 14 and the steadyrest 56. In order to shift the machine tool 10 from the machining position shown in FIGS. 6 and 7 into the machining position shown here, the support 44 is first of all run back, then rotated by 180° about the perpendicular axis 46 and finally traversed again towards the NC work spindle 14. During the lathe working operation by means of the tool 22, the support 44 with the steadyrest 56 fastened thereto can be traversed synchronously with and parallel to the traveling column 32, so that short support of the workpiece 20 is always ensured.

Figure 10:
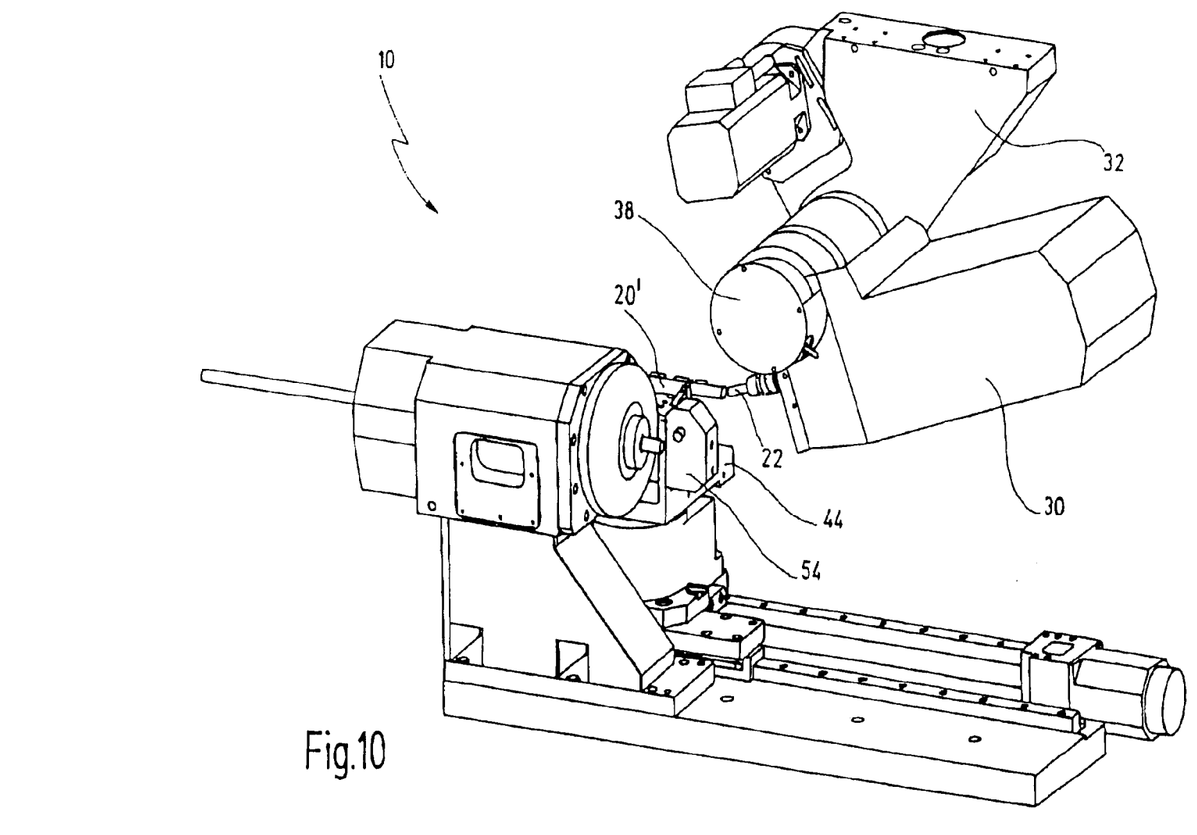
FIG. 10 shows the machine tool of FIG. 1 in a perspective representation, in which, in accordance with FIG. 5d, a rod-shaped workpiece is held by an NC work spindle and a power-operated clamping block turned round by 180°.

FIG. 10, in a perspective representation, shows the machine tool 10 in a machining position which corresponds to that shown in FIG. 5d. Here, the end face which has become accessible after the workpiece 20 has been turned round is machined by a tool 22, the spindle housing having been swiveled by about 80° relative to the position shown in FIG. 8.

What is claimed is:

1. A machine tool for machining a rod-shaped workpiece having a longitudinal axis, said machine tool comprising:

a tool spindle capable of rotating about a spindle axis and a first holder and a second holder for holding said workpiece, wherein said second holder is configured to be rotated or swiveled about a first swivel axis which is perpendicular to said longitudinal axis of said workpiece, wherein said second holder is oriented coaxially to said first holder in a first machining position, wherein said first holder is arranged spatially fixed, and said second holder is adapted to be traversed relative to said first holder and in parallel to said longitudinal axis of said workpiece, and wherein said second holder is arranged on a support which is rotatable about said first swivel axis, and for providing a swiveling movement, said second holder is arranged eccentrically to said first swivel axis, and said first swivel axis does not intersect said longitudinal axis of said workpiece.

2. The machine tool of claim 1, wherein said second holder is adapted to be rotated or swiveled about said first swivel axis by at least 180°.

3. The machine tool of claim 1, further comprising at least one third holder being arranged on said support eccentrically with respect to said first swivel axis, wherein, by rotation of said support about said first swivel axis, one of said second and third holders can be shifted into a position coaxial to the first holder.

4. The machine tool of claim 3, wherein said second and said third holders are designed differently.

5. The machine tool of claim 3, wherein said second and said third holders each are designed as one of the following; a steadyrest, a tailstock quill, or a power-operated clamping block.

6. The machine tool of claim 3, wherein said second and third holders are releasably fixed to said support.

7. The machine tool of claim 1, wherein said first holder is designed as a lathe spindle.

8. The machine tool of claim 1, wherein said first holder is designed as a clamping block.

9. The machine tool claim 1, further comprising a traveling column on which said tool spindle is arranged for movement of said tool spindle in each of three mutually orthogonal coordinate directions, and a swiveling device for swiveling said tool spindle about a second swivel axis.

10. The machine tool claim 9, wherein said second swivel axis is arranged perpendicularly to said spindle axis.

11. The machine tool claim 9, wherein said second swivel axis is arranged perpendicularly to said longitudinal axis of said workpiece.

12. The machine tool of claim 9, wherein said second swivel axis is arranged so as not to intersect said spindle axis.

13. The machine tool of claim 9, wherein said swiveling device is capable of swiveling said tool spindle by a swivel angle of at least 90°.

14. The machine tool of claim 9, further comprising a spindle housing accommodating said tool spindle, said spindle housing having a front half and a tool carrier located in said front half, wherein said second swivel axis runs at a level of said front half.

* * * * *